United States Patent
Ma et al.

(10) Patent No.: US 12,526,439 B2
(45) Date of Patent: Jan. 13, 2026

(54) RATE ADAPTATION FOR VIDEO CODING FOR MACHINES

(71) Applicant: QUALCOMM Incorporated, San Diego, CA (US)

(72) Inventors: Liangping Ma, San Diego, CA (US); Nikolai Konrad Leung, San Francisco, CA (US); Imed Bouazizi, Frisco, TX (US); Alberto Rico Alvarino, San Diego, CA (US); Charles Nung Lo, San Diego, CA (US); Thomas Stockhammer, Bergen (DE)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 18/639,731

(22) Filed: Apr. 18, 2024

(65) Prior Publication Data

US 2024/0357141 A1    Oct. 24, 2024

Related U.S. Application Data

(60) Provisional application No. 63/497,714, filed on Apr. 22, 2023.

(51) Int. Cl.
*H04N 19/42* (2014.01)
*H04N 19/124* (2014.01)

(52) U.S. Cl.
CPC ........... *H04N 19/42* (2014.11); *H04N 19/124* (2014.11)

(58) Field of Classification Search
CPC ............. H04N 19/70; H04N 21/85406; H04N 21/235; H04N 21/8455; H04N 21/8456;
(Continued)

(56) References Cited

U.S. PATENT DOCUMENTS

2009/0022065 A1    1/2009  Chen et al.
2015/0312572 A1*  10/2015  Owen ..................... H04L 65/70
                                                           375/240.02
(Continued)

FOREIGN PATENT DOCUMENTS

WO        2022167547 A1    8/2022

OTHER PUBLICATIONS

Bajic I.V., et al., "Collaborative Intelligence: Challenges and Opportunities", ICASSP 2021-2021 IEEE INternational Conference on Acoustics, Speech and Signal Processing (ICASSP), IEEE, Jun. 6, 2021, pp. 8493-8497.
(Continued)

*Primary Examiner* — Masum Billah
(74) *Attorney, Agent, or Firm* — Shumaker & Sieffert, P.A.

(57) ABSTRACT

An example a first network entity for processing feature set data formed from media data includes a processing system comprising one or more processors implemented in circuitry, the processing system being configured to: determine a first set of processing tasks of a series of processing tasks to be performed on a set of media data, the first set of processing tasks corresponding to tasks to be performed by the first network entity, wherein a second set of processing tasks is to be performed by a second network entity; perform the first set of processing tasks on the set of media data to form a feature map; encode the feature map to form an encoded feature map; and send the encoded feature map to the second network entity to enable the second network entity to perform the second set of processing tasks using the feature map.

31 Claims, 7 Drawing Sheets

(58) Field of Classification Search
CPC ........... H04N 19/597; H04N 21/23439; H04N 21/44209; H04N 21/21805
USPC ........................................................ 375/240
See application file for complete search history.

(56) References Cited

U.S. PATENT DOCUMENTS

| | | | |
|---|---|---|---|
| 2017/0325125 A1 | 11/2017 | Novo Diaz et al. | |
| 2018/0191867 A1* | 7/2018 | Siebel .................... | G06N 20/20 |
| 2021/0019560 A1 | 1/2021 | Yang et al. | |
| 2021/0019562 A1 | 1/2021 | Yang et al. | |
| 2021/0357652 A1 | 11/2021 | Wu | |
| 2022/0101100 A1 | 3/2022 | Bastani et al. | |
| 2022/0116627 A1* | 4/2022 | Liu ...................... | H04N 19/147 |
| 2024/0311621 A1* | 9/2024 | Kumaraswamy ...... | G06N 3/084 |

OTHER PUBLICATIONS

International Search Report and Written Opinion—PCT/US2024/025438—ISA/EPO—Jul. 8, 2024.

ISO/IEC JTC 1/SC 29/WG2: "Updates on Video Coding for Machines", VCM AHG Chairs, Jul. 20, 2022, 15 Pages.

Kang Y., et al., "Neurosurgeon: Collaborative Intelligence Between the Cloud and Mobile Edge", Architectural Support for Programming Languages and Operating Systems, ACM, 2 Penn Plaza, Suite 701 New York NY 10121-0701 USA, Apr. 4, 2017, pp. 615-629.

Schulzrinne H., et al., "RTP: A Transport Protocol for Real-Time Applications", Network Working Group, Request for Comments: 3550, No. 1889, Jul. 2003, XP003022794, The Internet Society, pp. 1-89.

Shi C., et al., "Privacy-Aware Edge Computing Based on Adaptive DNN Partitioning", 2019 IEEE Global Communications Conference (GLOBECOM), IEEE, Dec. 9, 2019, 6 Pages.

Wang H., et al., "Context-aware Adaptive Surgery: A Fast and Effective Framework for Adaptative Model Partition", Proceedings of the ACM on Interactive, Mobile, Wearable And Ubiquitous Technologies, ACMPUB27, New York, NY, USA, vol. 5, No. 3, Article 131, Sep. 14, 2021, pp. 1-22.

* cited by examiner

RATE ADAPTATION FOR VIDEO CODING FOR MACHINES

This application claims the benefit of U.S. Provisional Application No. 63/497,714, filed Apr. 22, 2023, the entire contents of which are hereby incorporated by reference.

TECHNICAL FIELD

This disclosure relates to transport of encoded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265 (also referred to as High Efficiency Video Coding (HEVC)), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data has been encoded, the video data may be packetized for transmission or storage. The video data may be assembled into a video file conforming to any of a variety of standards, such as the International Organization for Standardization (ISO) base media file format and extensions thereof, such as AVC.

SUMMARY

In general, this disclosure describes techniques for performing bitrate adaptation when streaming feature data over a network, such as a 5G radio access network (RAN), between task networks. For example, features may be extracted and processed from input video data. The feature extraction and processing tasks may be divided and performed by different devices in different locations. Thus, a first device may extract features from input video data to form a feature map, and perform a first set of processes on the feature map, forming an intermediate feature map, then send the intermediate feature map to a second device via a network, e.g., 5G. The second device may then perform the remaining processes on the intermediate feature map. According to the techniques of this disclosure, the first and second devices may perform bitrate adaptation to vary an amount of data sent over the network. For example, the first and second devices may determine which tasks are to be performed by which devices, if certain tasks should be skipped, or the like. In this manner, the processing tasks to be performed by each entity can be customized according to operating contexts, which may improve performance by each device and reduce network bandwidth consumption, when necessary.

In one example, a method of processing feature set data formed from media data includes determining, by a first network entity, a first set of processing tasks of a series of processing tasks to be performed on a set of media data, the first set of processing tasks corresponding to tasks to be performed by the first network entity, wherein a second set of processing tasks of the series of processing tasks is to be performed by a second network entity; performing, by the first network entity, the first set of processing tasks on the set of media data to form a feature map; encoding, by the first network entity, the feature map to form an encoded feature map; and sending, by the first network entity, the encoded feature map to the second network entity to enable the second network entity to perform the second set of processing tasks using the feature map.

In another example, a first network entity for processing feature set data formed from media data includes a memory configured to store media data; and a processing system comprising one or more processors implemented in circuitry, the processing system being configured to: determine a first set of processing tasks of a series of processing tasks to be performed on a set of media data, the first set of processing tasks corresponding to tasks to be performed by the first network entity, wherein a second set of processing tasks of the series of processing tasks is to be performed by a second network entity; perform the first set of processing tasks on the set of media data to form a feature map; encode the feature map to form an encoded feature map; and send the encoded feature map to the second network entity to enable the second network entity to perform the second set of processing tasks using the feature map.

In another example, a computer-readable storage medium has stored thereon instructions that, when executed, cause a processing system of a first network entity to: determine a first set of processing tasks of a series of processing tasks to be performed on a set of media data, the first set of processing tasks corresponding to tasks to be performed by the first network entity, wherein a second set of processing tasks of the series of processing tasks is to be performed by a second network entity; perform the first set of processing tasks on the set of media data to form a feature map; encode the feature map to form an encoded feature map; and send the encoded feature map to the second network entity to enable the second network entity to perform the second set of processing tasks using the feature map.

The details of one or more examples are set forth in the accompanying drawings and the description below. Other features, objects, and advantages will be apparent from the description and drawings, and from the claims.

DETAILED DESCRIPTION

In general, this disclosure is directed to techniques related to video coding for machines (VCM). VCM may be used when processing image or video data that is not necessarily to be used by human users, e.g., for video playback. For example, the video data may instead be processed for machine-based operational tasks, such as security monitoring, object detection/tracking, navigation for automated devices, machine vision, hybrid vision, or the like. In general, such processes may be performed using a task network, e.g., using one or more artificial intelligence/machine learning (AI/ML) models.

Per the techniques of this disclosure, the processing tasks of a task network may be split at a split point, such that a first set of processing tasks of the task network is performed by a first network entity (e.g., a source device), and a second set of processing tasks of the task network is performed by a second network entity (e.g., a destination device). The source device may include a camera for capturing image or video data and a processing system configured to perform the first set of processing tasks. The source device may be, for example, a user equipment (UE) device. The source device may capture image or video data and perform the first set of processing tasks on the image or video data to extract a feature set, then encode the feature set and send the encoded feature set to the destination device. The destination device may then decode the feature set and perform the second set of processing tasks.

Per these techniques, the first network entity may determine the split point, separating the processing tasks into the first set of processing tasks and the second set of processing tasks, according to various operating conditions. For example, such conditions may include operations supported by the first network entity and the second network entity, bandwidth conditions of a network connection between the first network entity and the second network entity, a battery charge level of the source device/first network device, or the like. The first network entity may further determine coding configuration information to be applied when encoding the feature map, e.g., based on the bandwidth conditions and other operating conditions. In this manner, the processing tasks may be efficiently distributed, while also reducing bandwidth consumption when available bandwidth has been reduced, thereby improving performance of the overall image processing system. These techniques may also allow the first network entity to operate in a low battery charge state while still participating in the processing operations.

Figure 1:
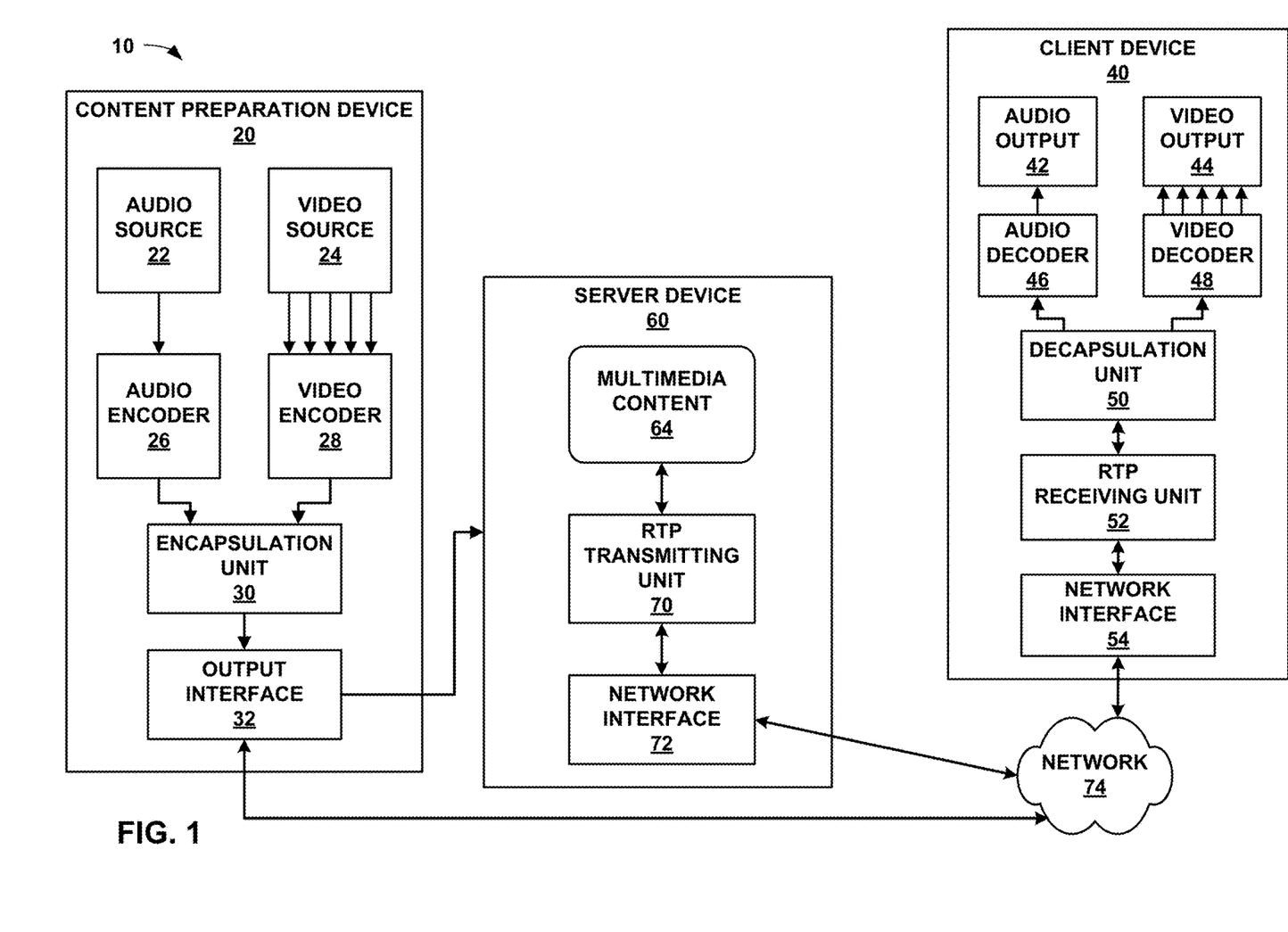
FIG. 1 is a block diagram illustrating an example system that implements techniques for streaming media data over a network.

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for an encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a media presentation. For example, the coded video or audio part of the media presentation can be an elementary stream. An elementary stream may be converted into a packetized elementary stream (PES) before being encapsulated within a video file. Within the same media presentation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into streamable media data.

Encapsulation unit 30 receives PES packets for elementary streams of a media presentation from audio encoder 26 and video encoder 28 and forms corresponding network abstraction layer (NAL) units from the PES packets. Coded video segments may be organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and supplemental enhancement information (SEI) NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture; hence, coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points.

Server device 60 includes Real-time Transport Protocol (RTP) transmitting unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of media content 64 and include components that conform substantially to those of server device 60. In general, network interface 72 is configured to send and receive data via network 74.

RTP transmitting unit 70 is configured to deliver media data to client device 40 via network 74 according to RTP, which is standardized in Request for Comment (RFC) 3550 by the Internet Engineering Task Force (IETF). RTP transmitting unit 70 may also implement protocols related to RTP, such as RTP Control Protocol (RTCP), Real-time Streaming Protocol (RTSP), Session Initiation Protocol (SIP), and/or Session Description Protocol (SDP). RTP transmitting unit 70 may send media data via network interface 72, which may implement Uniform Datagram Protocol (UDP) and/or Internet protocol (IP). Thus, in some examples, server device 60 may send media data via RTP and RTSP over UDP using network 74.

RTP transmitting unit 70 may receive an RTSP describe request from, e.g., client device 40. The RTSP describe request may include data indicating what types of data are supported by client device 40. RTP transmitting unit 70 may respond to client device 40 with data indicating media streams, such as media content 64, that can be sent to client device 40, along with a corresponding network location identifier, such as a uniform resource locator (URL) or uniform resource name (URN).

RTP transmitting unit 70 may then receive an RTSP setup request from client device 40. The RTSP setup request may generally indicate how a media stream is to be transported. The RTSP setup request may contain the network location identifier for the requested media data (e.g., media content 64) and a transport specifier, such as local ports for receiving RTP data and control data (e.g., RTCP data) on client device 40. RTP transmitting unit 70 may reply to the RTSP setup request with a confirmation and data representing ports of server device 60 by which the RTP data and control data will be sent. RTP transmitting unit 70 may then receive an RTSP play request, to cause the media stream to be "played," i.e., sent to client device 40 via network 74. RTP transmitting unit 70 may also receive an RTSP teardown request to end the streaming session, in response to which, RTP transmitting unit 70 may stop sending media data to client device 40 for the corresponding session.

RTP receiving unit 52, likewise, may initiate a media stream by initially sending an RTSP describe request to server device 60. The RTSP describe request may indicate types of data supported by client device 40. RTP receiving unit 52 may then receive a reply from server device 60 specifying available media streams, such as media content 64, that can be sent to client device 40, along with a corresponding network location identifier, such as a uniform resource locator (URL) or uniform resource name (URN).

RTP receiving unit 52 may then generate an RTSP setup request and send the RTSP setup request to server device 60. As noted above, the RTSP setup request may contain the network location identifier for the requested media data (e.g., media content 64) and a transport specifier, such as local ports for receiving RTP data and control data (e.g., RTCP data) on client device 40. In response, RTP receiving unit 52 may receive a confirmation from server device 60, including ports of server device 60 that server device 60 will use to send media data and control data.

After establishing a media streaming session between server device 60 and client device 40, RTP transmitting unit 70 of server device 60 may send media data (e.g., packets of media data) to client device 40 according to the media streaming session. Server device 60 and client device 40 may exchange control data (e.g., RTCP data) indicating, for example, reception statistics by client device 40, such that server device 60 can perform congestion control or otherwise diagnose and address transmission faults.

Network interface 54 may receive and provide media of a selected media presentation to RTP receiving unit 52, which may in turn provide the media data to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Decapsulation unit 50 may thus be viewed as configured to perform operations that reverse those operations performed by the encapsulation unit 30, as above discussed with respect to content preparation device 20. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, RTP receiving unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, RTP receiving unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well as audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via RTP receiving unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Figure 2:
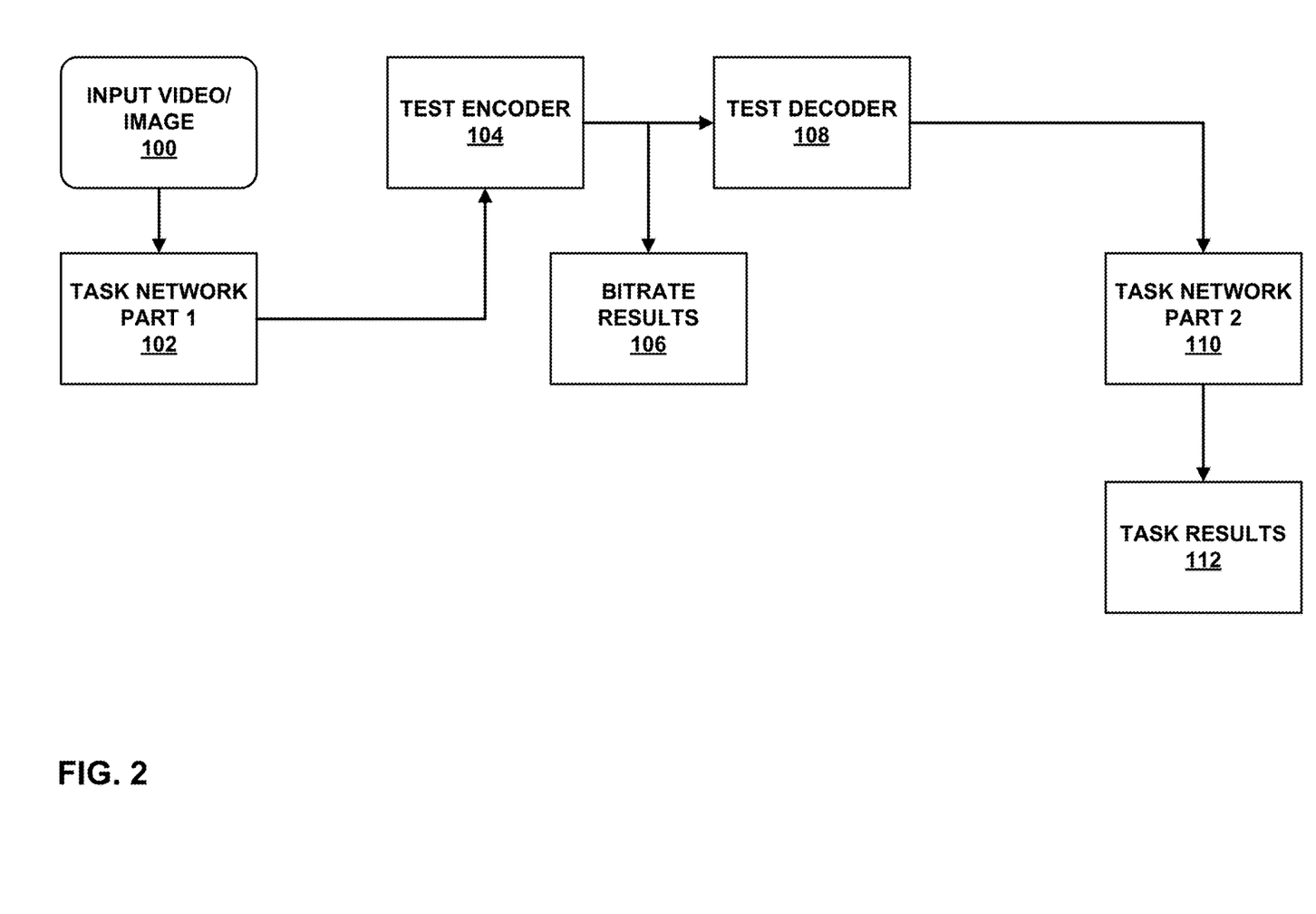
FIG. 2 is a conceptual diagram illustrating an example system that may perform the techniques of this disclosure.

FIG. 2 is a conceptual diagram illustrating an example system that may perform the techniques of this disclosure. In this example, FIG. 2 depicts a system including task network part 1 102, test encoder 104, bitrate results 106, test decoder 108, and task network part 2 110. In general, task network part 1 102 receives input video/image data 100, which may represent a single image, a sequence of images, video data, or the like. Task network part 1 102 may generally perform feature extract and process a resulting feature map according to a defined set of tasks. Test encoder 104 may encode the partially processed feature map and send the encoded feature map to test decoder 108. Test decoder 108 may then decode the partially processed feature map and provide the decoded partially processed feature map to task network part 2 110. Task network part 2 110 may perform a remaining set of feature map processing tasks and output task results 112. In this manner, together, task networks part 1 102 and task network part 2 110 form a complete task network, e.g., a neural network for instance segmentation or object tracking. Furthermore, in some examples, bitrate results 106 may be analyzed to determine a bitrate of the encoded partially processed feature map, to compare bitrate results based on which tasks are performed by task network part 1 102.

The techniques of this disclosure may include feature compression for video coding for machines (FC-VCM), e.g., according to "Updates on Video Coding for Machines," WG 2, MPEG Technical Requirements, July 2022, available at www.mpeg.org/wp-content/uploads/mpeg_meetings/139_OnLine/w21826.zip.

Figure 3:
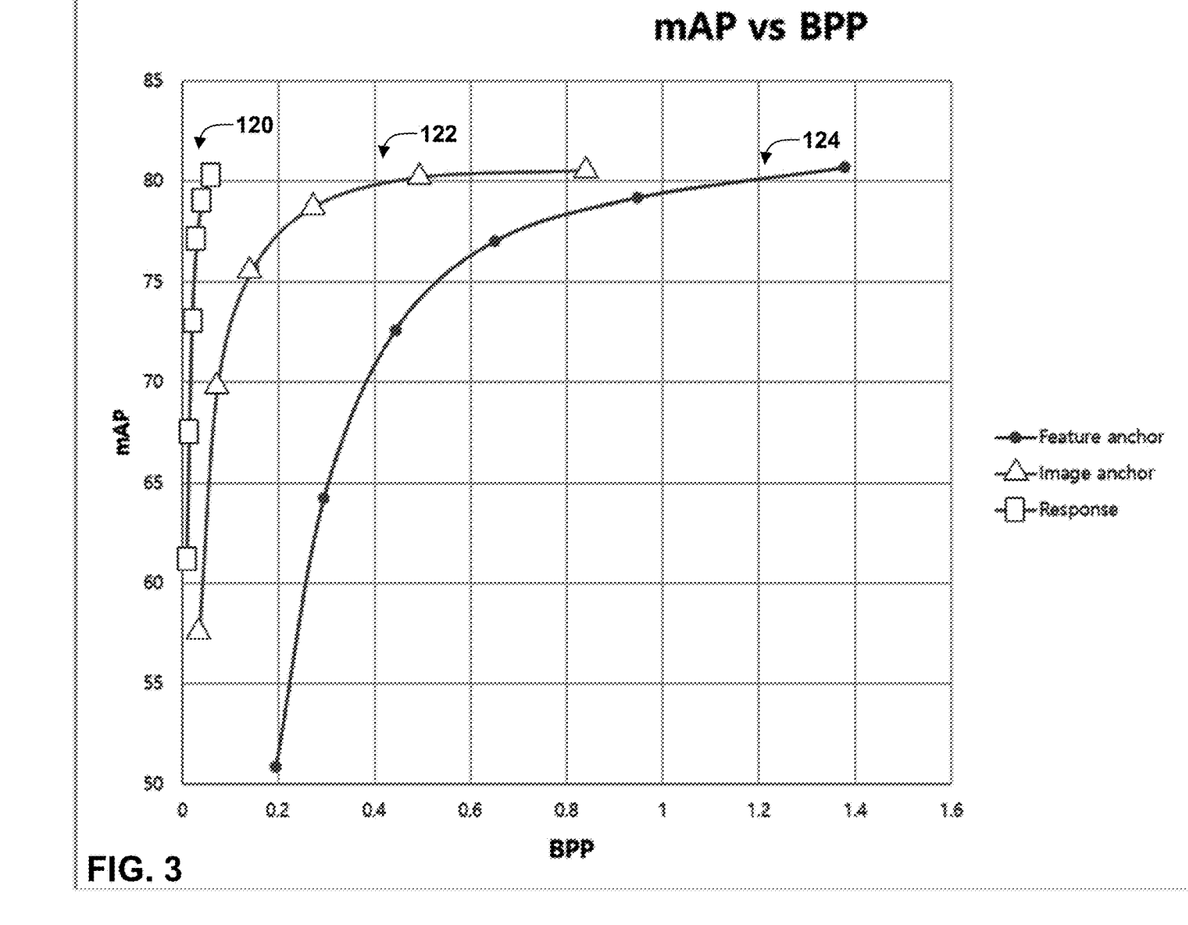
FIG. 3 is a graph depicting performance results of feature compression for video coding for machines.

FIG. 3 is a graph depicting performance results of feature compression for video coding for machines. The performance of the task network may depend on bit rate. In the graph of FIG. 3, mean average precision (MAP) is compared against bit rate per pixel (BPP) for instance segmentation tasks. As shown, FC-VCM curve 120 indicates that FC-VCM offers significant performance gain over, e.g., feature anchor performance indicated by feature anchor curve 124 and image anchor techniques indicated by image anchor curve 122. FV-VCM also offers privacy and compute offloading, because a person or other entity cannot detect identifying characteristics from a feature map.

In general, the bitstream bit rate should match the capacity of the communication network. The capacity of the communication network available to an encoder may change over time, e.g., due to user mobility and network load. A realistic communication network should be considered. Factors affecting the feature bitrate may include the split of and selection of inner structures of the task network, quantization of the features, and/or compression of the features. This disclosure describes techniques related to signaling aspects between the two end points for FC-VCM that may enable dynamic splits and/or inner structure selection of a computing graph in response to bitrate adaptation for FC-VCM. This may include representation and/or negotiation.

Figure 4:
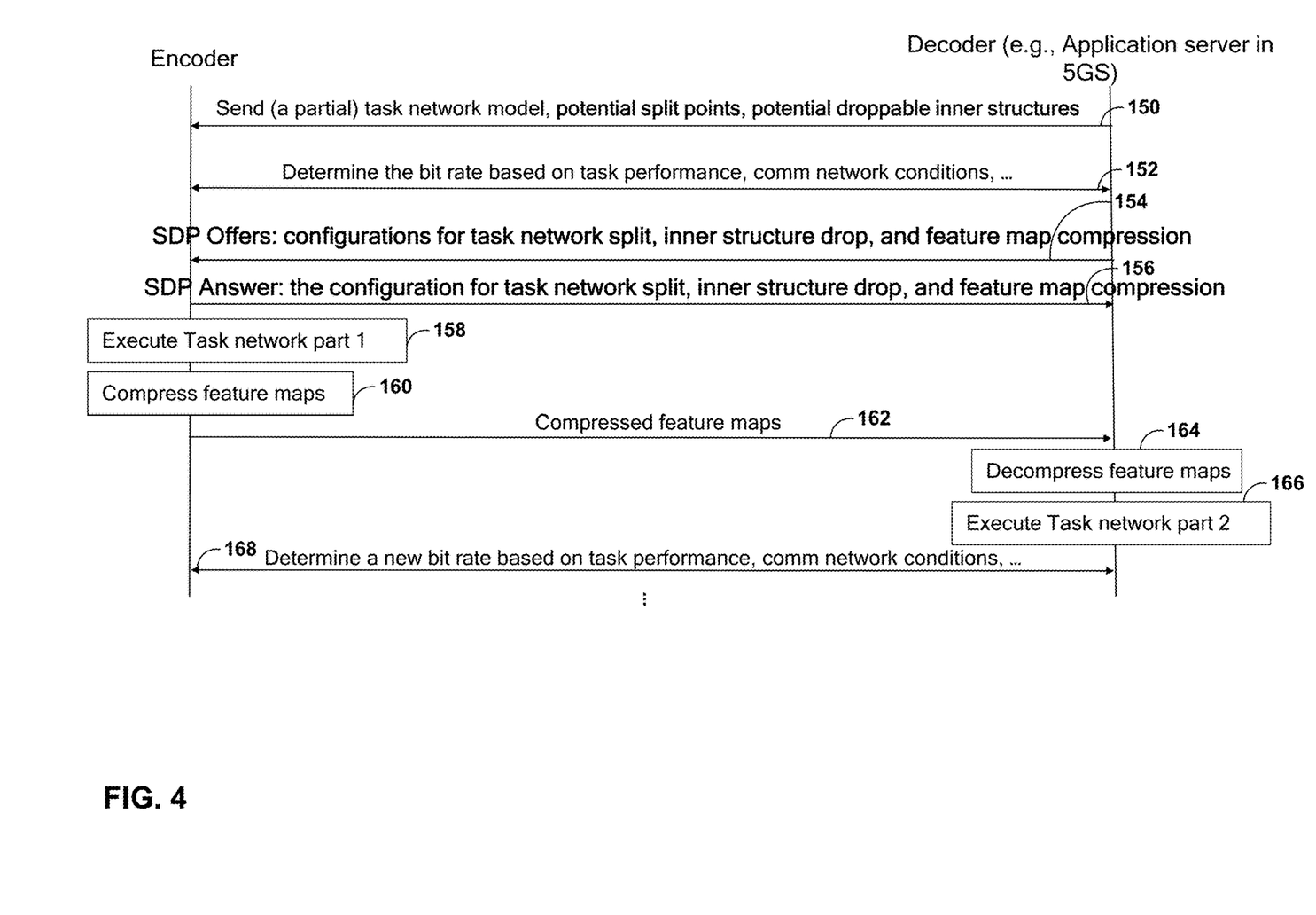
FIG. 4 is a call flow diagram illustrating an example method of negotiating a task split and droppable structures according to the techniques of this disclosure.

FIG. 4 is a call flow diagram illustrating an example method of negotiating a task split and droppable structures according to the techniques of this disclosure. The method of FIG. 4 may be performed by task network part 1 102, test encoder 104, task network part 2 110, and test decoder 108 of FIG. 2, or by the task networks or other devices including or in communication with these elements. Test decoder 108, which may be an application server in 5G, may send a partial or full task network model, potential split points, potential droppable inner structures, or the like, to test encoder 104 (150). Test encoder 104 and test decoder 108 may then negotiate to determine a bit rate for the bitstream based on task performance, communication network conditions, or other such characteristics (152). Test decoder 108 may then send a session description protocol (SDP) offer including data representing configuration for the task network split, inner structures of the task network to be dropped (if any), and/or feature map compression configuration (154). Test encoder 104 may then reply with an SDP answer indicating the configuration for the task network split, the inner structures to be dropped, and/or the feature map compression (156).

Task network part 1 102 (which may be included in a UE or other device that also includes test encoder 104) may then perform part 1 of the task network (up to the negotiated split point) according to the task network split and inner structures to be dropped to form an intermediate feature map (158). Test encoder 104 may then compress the intermediate feature map according to the configured feature map compression (160). Test encoder 104 may then send the compressed intermediate feature map to test decoder 108 (162). Test decoder 108 may decompress the intermediate feature map (164). Task network part 2 110 may then perform part 2 of the task network according to the negotiation, e.g., the task split and any dropped inner structures (166). This process may repeat for subsequent images/feature maps, e.g., in response to changes in the available network bandwidth. That is, test encoder 104 and test decoder 108 may determine a new bit rate based on task performance, communication network conditions, or the like (168) for subsequent feature maps, as well as a new split point and/or tasks to be dropped from the task network according to the new bit rate.

Figure 5:
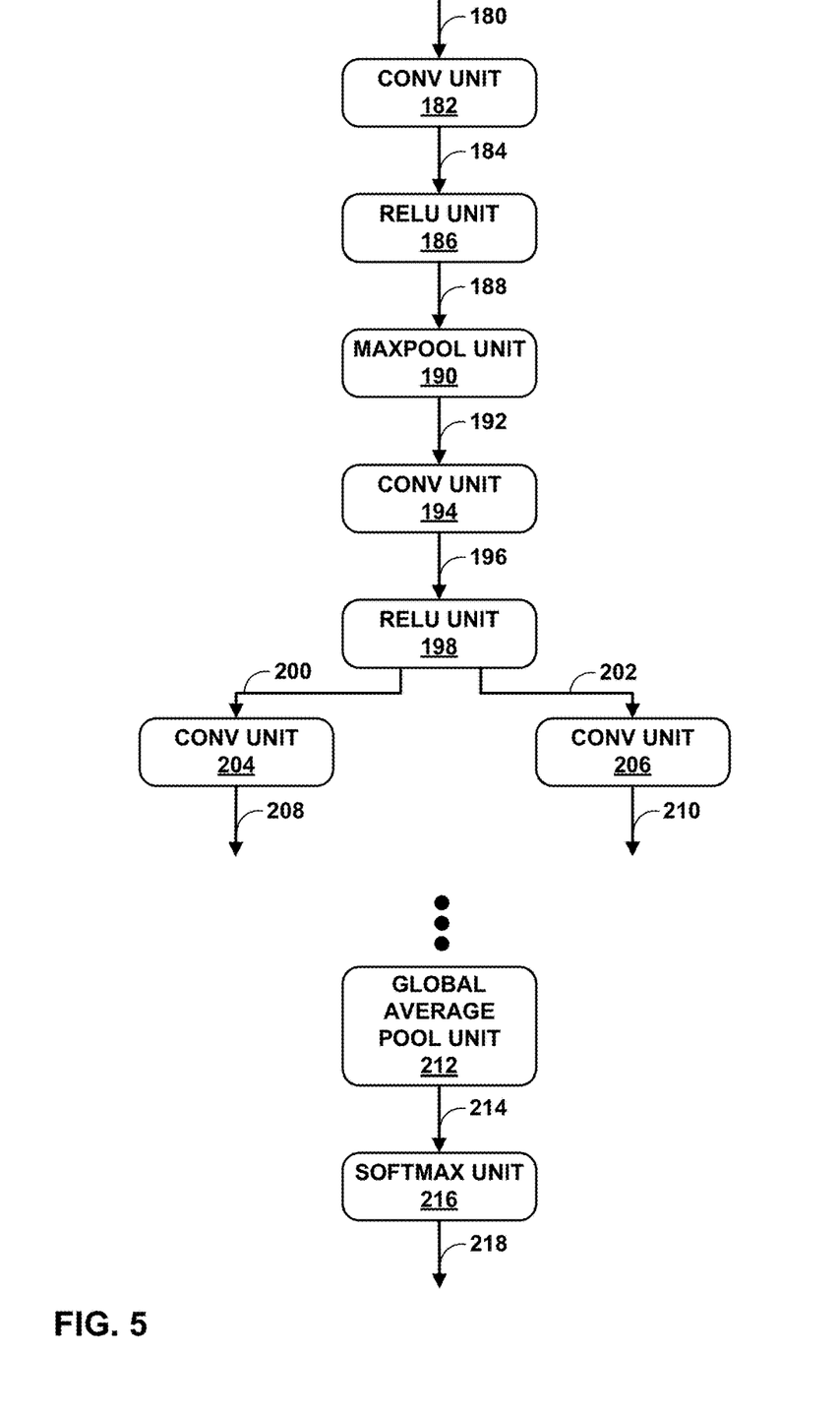
FIG. 5 is a graph illustrating an example computing graph according to techniques of this disclosure.

FIG. 5 is a graph illustrating an example computing graph according to techniques of this disclosure. In some examples, the techniques of this disclosure include identification of potential split points and potential droppable inner structures, as discussed above. The example of FIG. 5 depicts inner structures including convolution (conv) unit 182, ReLU unit 184, MaxPool unit 190, convolution unit 194, ReLU unit 198, convolution unit 204, convolution unit 206, global average pool unit 212, and SoftMax unit 216.

In this example, convolution unit 182 receives data_0 180. Convolution unit 182 may have a W of <64×3×3×3> and a B of <64>. Convolution unit 182 may output conv1_1 184, and ReLU unit 186 may process conv1_1 184 to form conv1_2 188. MaxPool unit 190 may process conv1_2 188 to form pool1_1 192. Convolution unit 194 may have a W of <16×64×1×1> and a B of <16>. Convolution unit 194 may process pool1_1 192 to form fire2/squeeze1×1_1 196.

ReLU unit 198 may process fire2/squeeze1×1_1 196 to form either or both of fire2/squeeze1×1_2 200 and/or fire2/squeeze1×1_2 202. Convolution unit 204 may have a W of <64×16×1×1> and a B of <64> and may process fire2/squeeze1×1_2 200 to form fire2/expand1×1_1 208. Convolution unit 206 may have a W of <64×16×3×3> and a B of <64> and may process fire2/squeeze1×1_2 202 to form fire2/expand3×3_1 210. Additional units not shown in FIG. 5 may form part of the task network. Ultimately, global average pool unit 212 may receive the processed data and form pool10_1 214. SoftMax unit 216 may process pool10_1 214 to form softamxout_1 218.

A task network repository may include data representing various identifiers of potential split points and/or potential droppable inner structures of a computing graph, such as that shown in FIG. 5. The computing graph may be, for example, MLP, CNN, LSTM, GRU, transformer, or the like. The task network repository may send this data to the two entities involved in splitting the task network, e.g., a user equipment (UE) and an application server (AS). The AS may perform the task network part 1 and encoder-side functionality, while the UE may perform the decoder and task network part 2 functionality, for example.

A split point may be the output of a computing node in the computing graph. For example, the split point may be the output of a MAX POOL2 layer of an AlexNet. In the example of FIG. 5, any of data_0 180, conv1_1 184, conv1_2 188, pool1_1 192, fire2/squeeze1×1_1 196, fire2/squeeze1×1_2 200, fire2/squeeze1×1_2 202, fire2/expand1×1_1 208, fire2/expand3×3_1 210, pool10_1 214, or softmaxout_1 218 may correspond to the split point between task network part 1 and task network part 2.

An inner structure to drop may be a computing node or the output of a computing node. For example, P2 in a base R-convolutional neural network (CNN) FPN network may be dropped.

Identifiers for split points and/or droppable inner structures may be labels generated by applying a computing graph description tool to the computing graph, which may also be signaled. In FIG. 5, examples of the labels are conv1_1 184, conv1_2 188, pool1_1 192, pool10_1 214, softmaxout_1 218, and so on. The identifiers may be encoded labels (to reduce size/bitrate). For example, encoding may output 8 bits if there are 256 possible combined potential split points and potential inner structures that can be dropped. Two sets of identifiers may be used: one for potential split points and another for potential inner structures to drop. The network repository may be collocated with an entity, e.g., the application server.

The task network repository may also send the computing graph description tool or an indication of the computing graph description tool. Examples of computing graph description tools include Open Neural Network Exchange (ONNX) and Neural Network Exchange Format (NNEF). In some examples, the task network repository may alternatively send a URI, URL, or URN that defines and labels the split points or inner structures to drop. That is, the labels generated by the computing graph description tool may conform to one of ONNX, NNEF, URLs, URIs, or URNs.

Figure 6:
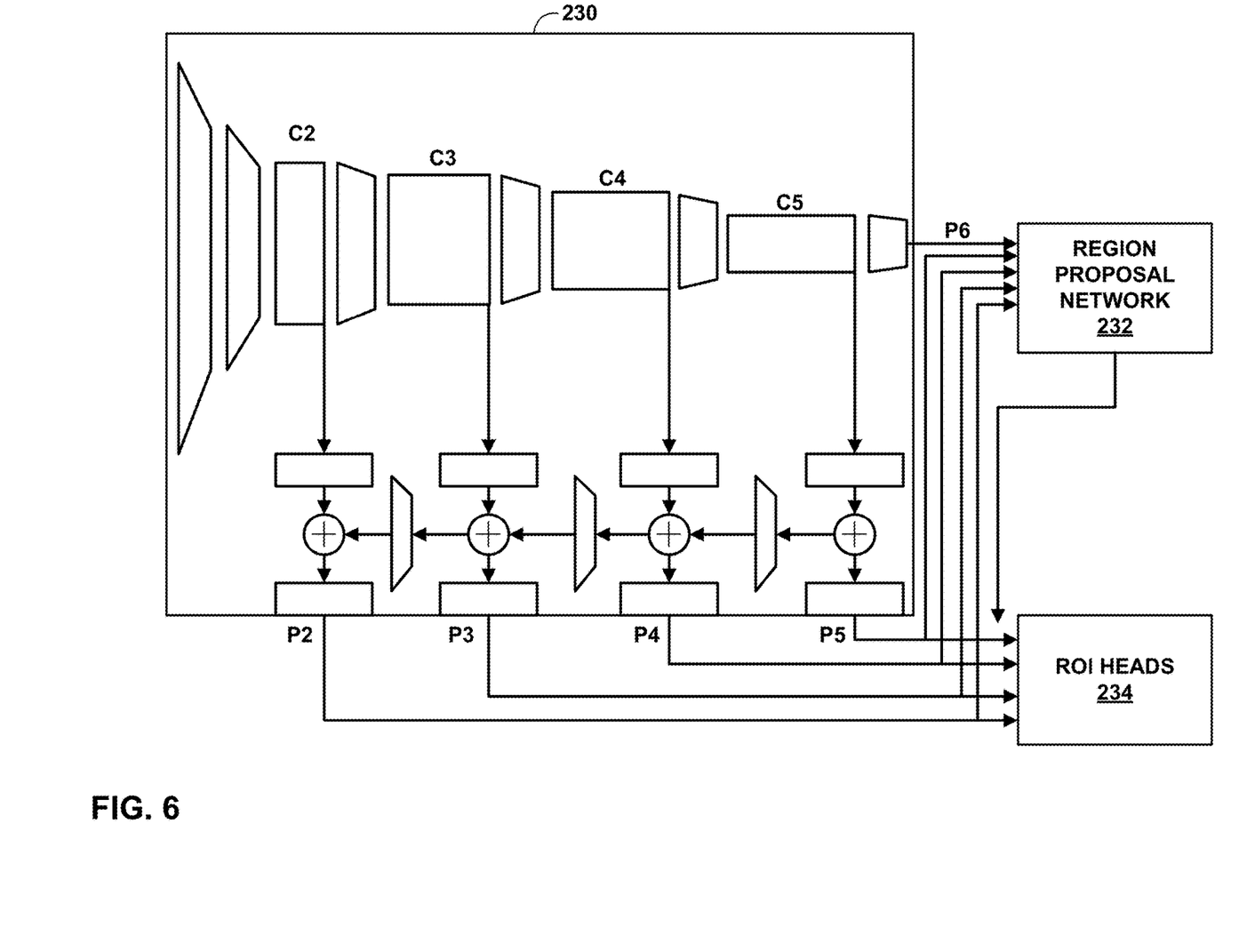
FIG. 6 is a conceptual diagram illustrating a region-based convolutional neural network feature pyramid network (R-CNN FPN).

FIG. 6 is a conceptual diagram illustrating a region-based convolutional neural network feature pyramid network (R-CNN FPN). That is, FIG. 6 depicts backbone network 230, as well as region proposal network 232 and ROI heads 234. The P-layers (P2, P3, P4, P5 in FIG. 6) represent potential break points. Pn may be the output features scaled at $½^{n-1}$. Not all P-layers are necessarily used, depending on the task performance.

In some examples, the techniques of this disclosure include negotiation or re-negotiation for dynamic task network splits, inner structure drops, and/or feature map compression. The two entities (e.g., a UE and an edge server device) may negotiate/re-negotiate the configurations for actions including task performance split, inner structure drop, and/or map compression based on the task performance (e.g., accuracy, inference latency), battery power, and/or network conditions (e.g., delay, throughput, packet loss rate), or the like. One entity (e.g., the application server) may send supported configurations for each action. The other entity (e.g., the UE) may reply with a selected configuration for each action.

The configuration for the action of feature compression may include any or all of: the compression method, e.g., principal component analysis, video coding based compression, or neural network based compression; and/or the parameter associated with the compression method, e.g., quantization of the outputs from a 32-bits representation of a feature map to an 8-bits representation.

The negotiation may be carried by, e.g., an SDP Offer and SDP Answer, codec-level messages, e.g., supplemental enhancement information (SEI) messages, RTCP messages, HTTP messages, and/or RTP/SRTP header extensions.

Figure 7:
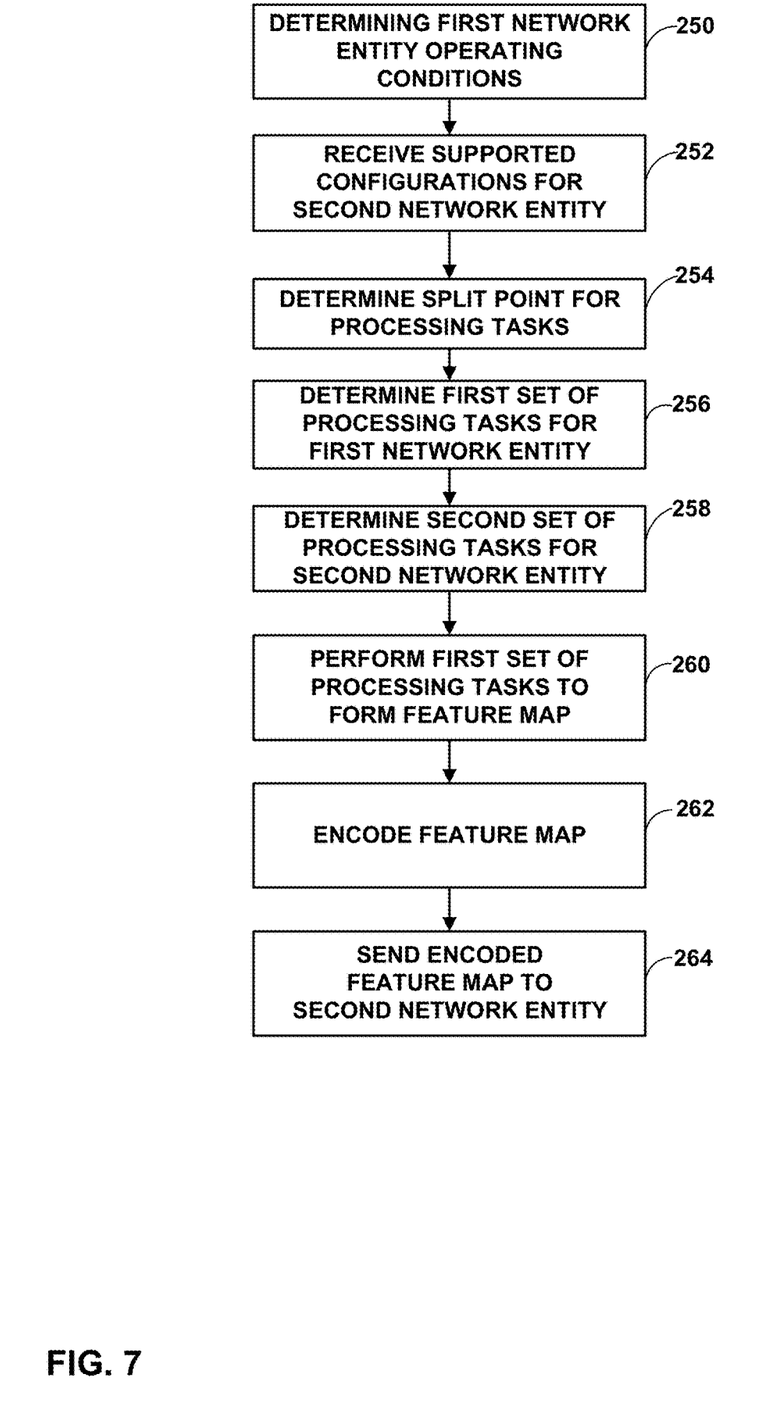
FIG. 7 is a flowchart illustrating an example method of processing a feature map according to techniques of this disclosure.

FIG. 7 is a flowchart illustrating an example method of processing a feature map according to techniques of this disclosure. The method of FIG. 7 is described with respect to a source device, which may include task network part 1 102 and test encoder 104 of FIG. 2, although other devices (such as content preparation device 20 of FIG. 1) may be configured to perform this or a similar method. The source device generally performs a first set of processing tasks of a task network, while a destination device generally performs a second set of processing tasks of the task network, as discussed above.

Initially, the source device (which represents a first network entity) may determine operating conditions of the first network entity (250). For example, the source device may check network bandwidth availability between itself and a second network entity, such as a destination entity (e.g., client device 40 of FIG. 1 or an entity including test decoder 108 and task network part 2 110 of FIG. 2). Additionally or alternatively, the source device may determine whether a battery charge level is above a threshold.

Furthermore, the source device may receive data representing supported configurations for the second network entity (252). The supported configurations may represent any of a compression method for compressing a feature map, encoding parameters (e.g., a quantization parameter (QP)) for compressing the feature map, supported processing tasks, or the like.

Based on the operating conditions and the supported configurations, the source device may determine a split point for processing tasks of a task network (254). In particular, the source device may determine a first set of processing tasks of the task network to be performed by the first network entity (256) and determine a second set of tasks of the task network to be performed by the second network entity (258).

The source device may then perform the first set of processing tasks on image data to form a feature map (260)

from the image data. The source device may then encode the feature map (262), e.g., according to the supported configurations as determined above. The source device may then send the encoded feature map to the destination device/second network entity to cause the second network entity to perform the second set of processing tasks of the task network (264).

The source device may further send data representative of the second set of processing tasks to the destination device/second network entity, e.g., in the form of one or more of a session description protocol (SDP) offer message, an SDP answer message, an encoder/decoder (CODEC) level message, a supplemental enhancement information (SEI) message, a real-time transport protocol (RTP) message, an HTTP message, an RTP control protocol (RTCP) message, or a secure RTP (SRTP) message.

In this manner, the method of FIG. 7 represents an example of a method of processing feature set data formed from media data, including: determining, by a first network entity, a first set of processing tasks of a series of processing tasks to be performed on a set of media data, the first set of processing tasks corresponding to tasks to be performed by the first network entity, wherein a second set of processing tasks of the series of processing tasks is to be performed by a second network entity; performing, by the first network entity, the first set of processing tasks on the set of media data to form a feature map; encoding, by the first network entity, the feature map to form an encoded feature map; and sending, by the first network entity, the encoded feature map to the second network entity to enable the second network entity to perform the second set of processing tasks using the feature map.

Various examples of the techniques of this disclosure are summarized in the following clauses:

Clause 1: A method of processing feature set data formed from media data, the method comprising: determining, by a first network entity, a first set of processing tasks of a series of processing tasks to be performed on a set of media data, the first set of processing tasks corresponding to tasks to be performed by the first network entity, wherein a second set of processing tasks of the series of processing tasks is to be performed by a second network entity; performing, by the first network entity, the first set of processing tasks on the set of media data to form a feature map; encoding, by the first network entity, the feature map to form an encoded feature map; and sending, by the first network entity, the encoded feature map to the second network entity to enable the second network entity to perform the second set of processing tasks using the feature map.

Clause 2: The method of clause 1, wherein the first network entity comprises a user equipment (UE) and the second network entity comprises an application server (AS).

Clause 3: The method of clause 1, wherein determining the first set of processing tasks comprises: receiving, from the second network entity, supported configurations for the series of processing tasks; and determining a split point between the first set of processing tasks and the second set of processing tasks.

Clause 4: The method of clause 3, wherein the supported configurations includes data representing a compression method for the feature map following one of the tasks of the series of processing tasks.

Clause 5: The method of clause 4, wherein the supported configurations further includes data representing a parameter associated with the compression method.

Clause 6: The method of clause 5, wherein the parameter represents an amount of quantization applied to values of the feature map.

Clause 7: The method of clause 1, wherein determining the first set of processing tasks comprises: determining a charge level of a battery of the first network entity; and determining the first set of processing tasks according to whether the charge level is above a threshold.

Clause 8: The method of clause 1, wherein determining the first set of processing tasks comprises: determining an available amount of network bandwidth in a network by which the first network entity communicates with the second network entity; and determining the first set of processing tasks according to whether the available amount of network bandwidth is above a threshold.

Clause 9: The method of clause 1, further comprising sending data representative of the second set of processing tasks to the second network entity.

Clause 10: The method of clause 9, wherein sending the data representative of the second set of processing tasks comprises sending the data representative of the second set of processing tasks in at least one of a session description protocol (SDP) offer message, an SDP answer message, an encoder/decoder (CODEC) level message, a supplemental enhancement information (SEI) message, a real-time transport protocol (RTP) message, an HTTP message, an RTP control protocol (RTCP) message, or a secure RTP (SRTP) message.

Clause 11: The method of clause 1, further comprising receiving data representative of identifiers of two or more potential split points in the series of processing tasks, the split points each representing a point at which the series of processing tasks can be partitioned into the first set of processing tasks and the second set of processing tasks.

Clause 12: The method of clause 11, wherein the series of processing tasks is defined in a computing graph, and wherein the identifiers comprise labels generated by a computing graph description tool applied to the computing graph.

Clause 13: The method of clause 12, wherein the labels generated by the computing graph description tool conform to one of open neural network exchange (ONNX), neural network exchange formation (NNEF), uniform resource locators (URLs), uniform resource identifiers (URIs), or uniform resource names (URNs).

Clause 14: The method of clause 11, further comprising receiving data representative of identifiers of one or more droppable tasks in the series of processing tasks, wherein the first set of processing tasks and the second set of processing tasks excludes at least one of the one or more droppable tasks.

Clause 15: The method of clause 14, wherein the data representative of the identifiers of the two or more potential split points is separate from the data representative of the identifiers of the one or more droppable tasks.

Clause 16: The method of clause 11, wherein the data representative of the identifiers comprises encoded data representative of the identifiers.

Clause 17: The method of clause 11, wherein receiving the data representative of the identifiers comprises receiving the data representative of the identifiers from a task network repository.

Clause 18: The method of clause 17, wherein the task network repository is collocated with the second network entity.

Clause 19: A method of processing feature set data formed from media data, the method comprising: determining, by a first network entity, a first set of processing tasks of a series of processing tasks to be performed on a set of media data, the first set of processing tasks corresponding to tasks to be performed by the first network entity, wherein a second set of processing tasks of the series of processing tasks is to be performed by a second network entity; performing, by the first network entity, the first set of processing tasks on the set of media data to form a feature map; encoding, by the first network entity, the feature map to form an encoded feature map; and sending, by the first network entity, the encoded feature map to the second network entity to enable the second network entity to perform the second set of processing tasks using the feature map.

Clause 20: The method of clause 19, wherein the first network entity comprises a user equipment (UE) and the second network entity comprises an application server (AS).

Clause 21: The method of any of clauses 19 and 20, wherein determining the first set of processing tasks comprises: receiving, from the second network entity, supported configurations for the series of processing tasks; and determining a split point between the first set of processing tasks and the second set of processing tasks.

Clause 22: The method of clause 21, wherein the supported configurations includes data representing a compression method for the feature map following one of the tasks of the series of processing tasks.

Clause 23: The method of clause 22, wherein the supported configurations further includes data representing a parameter associated with the compression method.

Clause 24: The method of clause 23, wherein the parameter represents an amount of quantization applied to values of the feature map.

Clause 25: The method of any of clauses 19-24, wherein determining the first set of processing tasks comprises: determining a charge level of a battery of the first network entity; and determining the first set of processing tasks according to whether the charge level is above a threshold.

Clause 26: The method of any of clauses 19-25, wherein determining the first set of processing tasks comprises: determining an available amount of network bandwidth in a network by which the first network entity communicates with the second network entity; and determining the first set of processing tasks according to whether the available amount of network bandwidth is above a threshold.

Clause 27: The method of any of clauses 19-26, further comprising sending data representative of the second set of processing tasks to the second network entity.

Clause 28: The method of clause 27, wherein sending the data representative of the second set of processing tasks comprises sending the data representative of the second set of processing tasks in at least one of a session description protocol (SDP) offer message, an SDP answer message, an encoder/decoder (CODEC) level message, a supplemental enhancement information (SEI) message, a real-time transport protocol (RTP) message, an HTTP message, an RTP control protocol (RTCP) message, or a secure RTP (SRTP) message.

Clause 29: The method of any of clauses 19-28, further comprising receiving data representative of identifiers of two or more potential split points in the series of processing tasks, the split points each representing a point at which the series of processing tasks can be partitioned into the first set of processing tasks and the second set of processing tasks.

Clause 30: The method of clause 29, wherein the series of processing tasks is defined in a computing graph, and wherein the identifiers comprise labels generated by a computing graph description tool applied to the computing graph.

Clause 31: The method of clause 30, wherein the labels generated by the computing graph description tool conform to one of open neural network exchange (ONNX), neural network exchange formation (NNEF), uniform resource locators (URLs), uniform resource identifiers (URIs), or uniform resource names (URNs).

Clause 32: The method of any of clauses 29-31, further comprising receiving data representative of identifiers of one or more droppable tasks in the series of processing tasks, wherein the first set of processing tasks and the second set of processing tasks excludes at least one of the one or more droppable tasks.

Clause 33: The method of clause 32, wherein the data representative of the identifiers of the two or more potential split points is separate from the data representative of the identifiers of the one or more droppable tasks.

Clause 34: The method of any of clauses 29-33, wherein the data representative of the identifiers comprises encoded data representative of the identifiers.

Clause 35: The method of any of clauses 29-34, wherein receiving the data representative of the identifiers comprises receiving the data representative of the identifiers from a task network repository.

Clause 36: The method of clause 35, wherein the task network repository is collocated with the second network entity.

Clause 37: A device for retrieving media data, the device comprising one or means for performing the method of any of clauses 1-36.

Clause 38: The device of clause 37, wherein the one or more means comprise one or more processors implemented in circuitry.

Clause 39: The apparatus of clause 37, wherein the apparatus comprises at least one of: an integrated circuit; a microprocessor; and a wireless communication device.

Clause 40: A computer-readable storage medium having stored thereon instructions that, when executed, cause one or more processors to perform the method of any of clauses 1-36.

Clause 41: A first network entity for processing feature set data formed from media data, the first network entity comprising: a memory configured to store media data; and a processing system comprising one or more processors implemented in circuitry and configured to: determine a first set of processing tasks of a series of processing tasks to be performed on a set of media data, the first set of processing tasks corresponding to tasks to be performed by the first network entity, wherein a second set of processing tasks of the series of processing tasks is to be performed by a second network entity; perform the first set of processing tasks on the set of media data to form a feature map; encode the feature map to form an encoded feature map; and send the encoded feature map to the second network entity to enable the second network entity to perform the second set of processing tasks using the feature map.

Clause 42: The first network entity of clause 41, wherein the first network entity comprises a user equipment (UE) and the second network entity comprises an application server (AS).

Clause 43: The first network entity of clause 41, wherein to determine the first set of processing tasks, the processing system is configured to: receive, from the second network entity, supported configurations for the series of processing tasks; and determine a split point between the first set of processing tasks and the second set of processing tasks.

Clause 44: The first network entity of clause 43, wherein the supported configurations include data representing a compression method for the feature map following one of the tasks of the series of processing tasks.

Clause 45: The first network entity of clause 44, wherein the supported configurations further include data representing a parameter associated with the compression method.

Clause 46: The first network entity of clause 45, wherein the parameter represents an amount of quantization applied to values of the feature map.

Clause 47: The first network entity of clause 41, wherein to determine the first set of processing tasks, the processing system is configured to: determine a charge level of a battery of the first network entity; and determine the first set of processing tasks according to whether the charge level is above a threshold.

Clause 48: The first network entity of clause 41, wherein to determine the first set of processing tasks, the processing system is configured to: determine an available amount of network bandwidth in a network by which the first network entity communicates with the second network entity; and determine the first set of processing tasks according to whether the available amount of network bandwidth is above a threshold.

Clause 49: The first network entity of clause 41, wherein the processing system is further configured to send data representative of the second set of processing tasks to the second network entity.

Clause 50: The first network entity of clause 49, wherein the processing system is configured to send the data representative of the second set of processing tasks in at least one of a session description protocol (SDP) offer message, an SDP answer message, an encoder/decoder (CODEC) level message, a supplemental enhancement information (SEI) message, a real-time transport protocol (RTP) message, an HTTP message, an RTP control protocol (RTCP) message, or a secure RTP (SRTP) message.

Clause 51: The first network entity of clause 41, wherein the processing system is further configured to receive data representative of identifiers of two or more potential split points in the series of processing tasks, the split points each representing a point at which the series of processing tasks can be partitioned into the first set of processing tasks and the second set of processing tasks.

Clause 52: The first network entity of clause 51, wherein the series of processing tasks is defined in a computing graph, and wherein the identifiers comprise labels generated by a computing graph description tool applied to the computing graph.

Clause 53: The first network entity of clause 52, wherein the labels generated by the computing graph description tool conform to one of open neural network exchange (ONNX), neural network exchange formation (NNEF), uniform resource locators (URLs), uniform resource identifiers (URIs), or uniform resource names (URNs).

Clause 54: The first network entity of clause 51, wherein the processing system is further configured to receive data representative of identifiers of one or more droppable tasks in the series of processing tasks, wherein the first set of processing tasks and the second set of processing tasks excludes at least one of the one or more droppable tasks.

Clause 55: The first network entity of clause 54, wherein the data representative of the identifiers of the two or more potential split points is separate from the data representative of the identifiers of the one or more droppable tasks.

Clause 56: The first network entity of clause 55, wherein the data representative of the identifiers comprises encoded data representative of the identifiers.

Clause 57: The first network entity of clause 55, wherein the processing system is configured to receive the data representative of the identifiers from a task network repository.

Clause 58: The first network entity of clause 57, wherein the task network repository is collocated with the second network entity.

Clause 59: A computer-readable storage medium having stored thereon instructions that, when executed, cause a processing system of a first network entity to: determine a first set of processing tasks of a series of processing tasks to be performed on a set of media data, the first set of processing tasks corresponding to tasks to be performed by the first network entity, wherein a second set of processing tasks of the series of processing tasks is to be performed by a second network entity; perform the first set of processing tasks on the set of media data to form a feature map; encode the feature map to form an encoded feature map; and send the encoded feature map to the second network entity to enable the second network entity to perform the second set of processing tasks using the feature map.

Clause 60: A first network entity for processing feature set data formed from media data, the first network entity comprising: means for determining a first set of processing tasks of a series of processing tasks to be performed on a set of media data, the first set of processing tasks corresponding to tasks to be performed by the first network entity, wherein a second set of processing tasks of the series of processing tasks is to be performed by a second network entity; means for performing the first set of processing tasks on the set of media data to form a feature map; means for encoding the feature map to form an encoded feature map; and means for sending the encoded feature map to the second network entity to enable the second network entity to perform the second set of processing tasks using the feature map.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing feature set data formed from media data, the method comprising:
    determining, by a first network entity, a first set of processing tasks of a series of processing tasks to be performed on a set of media data, wherein the series of processing tasks are associated with a task network configured to process a set of media data to perform at least one of instance segmentation or object tracking and wherein the first set of processing tasks correspond to tasks to be performed by the first network entity and a second set of processing tasks of the series of processing tasks is to be performed by a second network entity;
    receiving data representative of at least one identifier of one or more droppable tasks in the series of processing tasks, wherein performance of the one or more droppable tasks may be excluded during processing of the set of media data to perform the at least one of instance segmentation or object tracking;
    performing, by the first network entity, the first set of processing tasks on the set of media data to form a feature map indicative of at least one feature extracted from the set of media data, wherein the first network entity does not perform the one or more droppable tasks during performance of the first set of processing tasks;
    encoding, by the first network entity, the feature map to form an encoded feature map; and
    sending, by the first network entity, the encoded feature map to the second network entity to enable the second network entity to perform the second set of processing tasks using the feature map.

2. The method of claim 1, wherein the first network entity comprises a user equipment (UE) and the second network entity comprises an application server (AS).

3. The method of claim 1, wherein determining the first set of processing tasks comprises:
    receiving, from the second network entity, supported configurations for the series of processing tasks; and
    determining a split point between the first set of processing tasks and the second set of processing tasks.

4. The method of claim 3, wherein the supported configurations include data representing a compression method for the feature map following one of the tasks of the series of processing tasks.

5. The method of claim 4, wherein the supported configurations further include data representing a parameter associated with the compression method.

6. The method of claim 5, wherein the parameter represents an amount of quantization applied to values of the feature map.

7. The method of claim 1, wherein determining the first set of processing tasks comprises:
    determining a charge level of a battery of the first network entity; and
    determining the first set of processing tasks according to whether the charge level is above a threshold.

8. The method of claim 1, wherein determining the first set of processing tasks comprises:
    determining an available amount of network bandwidth in a network by which the first network entity communicates with the second network entity; and
    determining the first set of processing tasks according to whether the available amount of network bandwidth is above a threshold.

9. The method of claim 1, further comprising sending data representative of the second set of processing tasks to the second network entity.

10. The method of claim 9, wherein sending the data representative of the second set of processing tasks comprises sending the data representative of the second set of processing tasks in at least one of a session description protocol (SDP) offer message, an SDP answer message, an encoder/decoder (CODEC) level message, a supplemental enhancement information (SEI) message, a real-time transport protocol (RTP) message, an HTTP message, an RTP control protocol (RTCP) message, or a secure RTP (SRTP) message.

11. The method of claim 1, further comprising receiving data representative of identifiers of two or more potential split points in the series of processing tasks, the split points each representing a point at which the series of processing tasks can be partitioned into the first set of processing tasks and the second set of processing tasks.

12. The method of claim 11, wherein the series of processing tasks is defined in a computing graph, and wherein the identifiers comprise labels generated by a computing graph description tool applied to the computing graph.

13. The method of claim 12, wherein the labels generated by the computing graph description tool conform to one of open neural network exchange (ONNX), neural network exchange formation (NNEF), uniform resource locators (URLs), uniform resource identifiers (URIs), or uniform resource names (URNs).

14. The method of claim 11, wherein the data representative of the identifiers of the two or more potential split points is separate from the data representative of the identifiers of the one or more droppable tasks.

15. The method of claim 11, wherein the data representative of the identifiers comprises encoded data representative of the identifiers.

16. The method of claim 11, wherein receiving the data representative of the identifiers comprises receiving the data representative of the identifiers from a task network repository.

17. A first network entity for processing feature set data formed from media data, the first network entity comprising:
a memory configured to store media data; and
a processing system comprising one or more processors implemented in circuitry, the processing system being configured to:
determine a first set of processing tasks of a series of processing tasks to be performed on a set of media data, wherein the series of processing tasks are associated with a task network configured to process a set of media data to perform at least one of instance segmentation or object tracking and wherein the first set of processing tasks correspond to tasks to be performed by the first network entity and a second set of processing tasks of the series of processing tasks is to be performed by a second network entity;
receive data representative of at least one identifier of one or more droppable tasks in the series of processing tasks, wherein performance of the one or more droppable tasks may be excluded during processing of the set of media data to perform the at least one of instance segmentation or object tracking;
perform the first set of processing tasks on the set of media data to form a feature map indicative of at least one feature extracted from the set of media data, wherein the first network entity does not perform the one or more droppable tasks during performance of the first set of processing tasks;
encode the feature map to form an encoded feature map; and
send the encoded feature map to the second network entity to enable the second network entity to perform the second set of processing tasks using the feature map.

18. The first network entity of claim 17, wherein the first network entity comprises a user equipment (UE) and the second network entity comprises an application server (AS).

19. The first network entity of claim 17, wherein to determine the first set of processing tasks, the processing system is configured to:
receive, from the second network entity, supported configurations for the series of processing tasks; and
determine a split point between the first set of processing tasks and the second set of processing tasks.

20. The first network entity of claim 19, wherein the supported configurations include data representative of a compression method for the feature map following one of the tasks of the series of processing tasks.

21. The first network entity of claim 20, wherein the supported configurations further include data representative of an amount of quantization applied to values of the feature map.

22. The first network entity of claim 17, wherein to determine the first set of processing tasks, the processing system is configured to:
determine a charge level of a battery of the first network entity; and
determine the first set of processing tasks based on the charge level.

23. The first network entity of claim 17, wherein to determine the first set of processing tasks, the processing system is configured to:
determine an available amount of network bandwidth in a network by which the first network entity communicates with the second network entity; and
determine the first set of processing tasks based on the available amount of network bandwidth.

24. The first network entity of claim 17, wherein the processing system is configured to send data representative of the second set of processing tasks to the second network entity.

25. The first network entity of claim 24, wherein to send data representative of the second set of processing tasks, the processing system is configured to send the data representative of the second set of processing tasks in at least one of a session description protocol (SDP) offer message, an SDP answer message, an encoder/decoder (CODEC) level message, a supplemental enhancement information (SEI) message, a real-time transport protocol (RTP) message, an HTTP message, an RTP control protocol (RTCP) message, or a secure RTP (SRTP) message.

26. The first network entity of claim 17, wherein the processing system is configured to receive data representative of identifiers of two or more potential split points in the series of processing tasks, the split points each representing a point at which the series of processing tasks can be partitioned into the first set of processing tasks and the second set of processing tasks.

27. The first network entity of claim 26, wherein the series of processing tasks is defined in a computing graph, and wherein the identifiers comprise labels generated by a computing graph description tool applied to the computing graph.

28. The first network entity of claim 27, wherein the labels generated by the computing graph description tool conform to one of open neural network exchange (ONNX), neural network exchange formation (NNEF), uniform resource locators (URLs), uniform resource identifiers (URIs), or uniform resource names (URNs).

29. The first network entity of claim 26, wherein the data representative of the identifiers of the two or more potential split points is separate from the data representative of the identifiers of the one or more droppable tasks.

30. The first network entity of claim 26, wherein the data representative of the identifiers comprises encoded data representative of the identifiers.

31. The first network entity of claim 26, wherein to receive the data representative of the identifiers, the processing system is configured to receive the data representative of the identifiers from a task network repository.

* * * * *